United States Patent [19]

Elwell

[11] Patent Number: 5,281,961
[45] Date of Patent: Jan. 25, 1994

[54] MOTION DETECTION SENSOR WITH COMPUTER INTERFACE

[75] Inventor: Brian E. Elwell, Brentwood, Calif.
[73] Assignee: Novitas, Inc., Culver City, Calif.
[21] Appl. No.: 830,441
[22] Filed: Jan. 21, 1992

Related U.S. Application Data

[63] Continuation of Ser. No. 549,331, Jul. 6, 1990, abandoned.

[51] Int. Cl.$^5$ .............................................. H04Q 1/00
[52] U.S. Cl. ................................ 340/825; 340/825.06; 340/541; 340/554
[58] Field of Search .............. 340/825, 825.06, 825.31, 340/825.34, 528, 541, 552, 554, 572

[56] References Cited

U.S. PATENT DOCUMENTS

| | | | |
|---|---|---|---|
| 3,898,383 | 8/1975 | Herbits | 315/291 |
| 4,225,808 | 9/1980 | Saraceni | 315/307 |
| 4,433,328 | 2/1984 | Saphir et al. | 340/554 |
| 4,595,915 | 6/1986 | Close | 340/572 |
| 4,661,720 | 4/1987 | Cameron, Jr. et al. | 340/554 |

Primary Examiner—Donald J. Yusko
Assistant Examiner—Edwin C. Holloway, III
Attorney, Agent, or Firm—Robbins, Berliner & Carson

[57] ABSTRACT

A ceiling sensor designed to interface with the computerized controllers of energy management systems is disclosed. This ceiling sensor is operable to detect motion through the use of a transmitted signal of predetermined frequency which when received has experienced a Doppler shift. Comparison of the received signal with its frequency change to the transmitted signal produces motion detection which when incorporated with an isolated latching relay enables the switching on and off of light, heating, air conditioning or security interfaces. A ceiling sensor is disclosed which is operable to detect the short, quick movements of employees working in a narrow range field of view such as a shop aisle or warehouse corridor. A second ceiling sensor is disclosed which is operable to detect the gross, large movements of employees in a large area such as an open room or warehouse. A method of fabricating a ceiling sensor for a computer controller interface is also described.

12 Claims, 4 Drawing Sheets

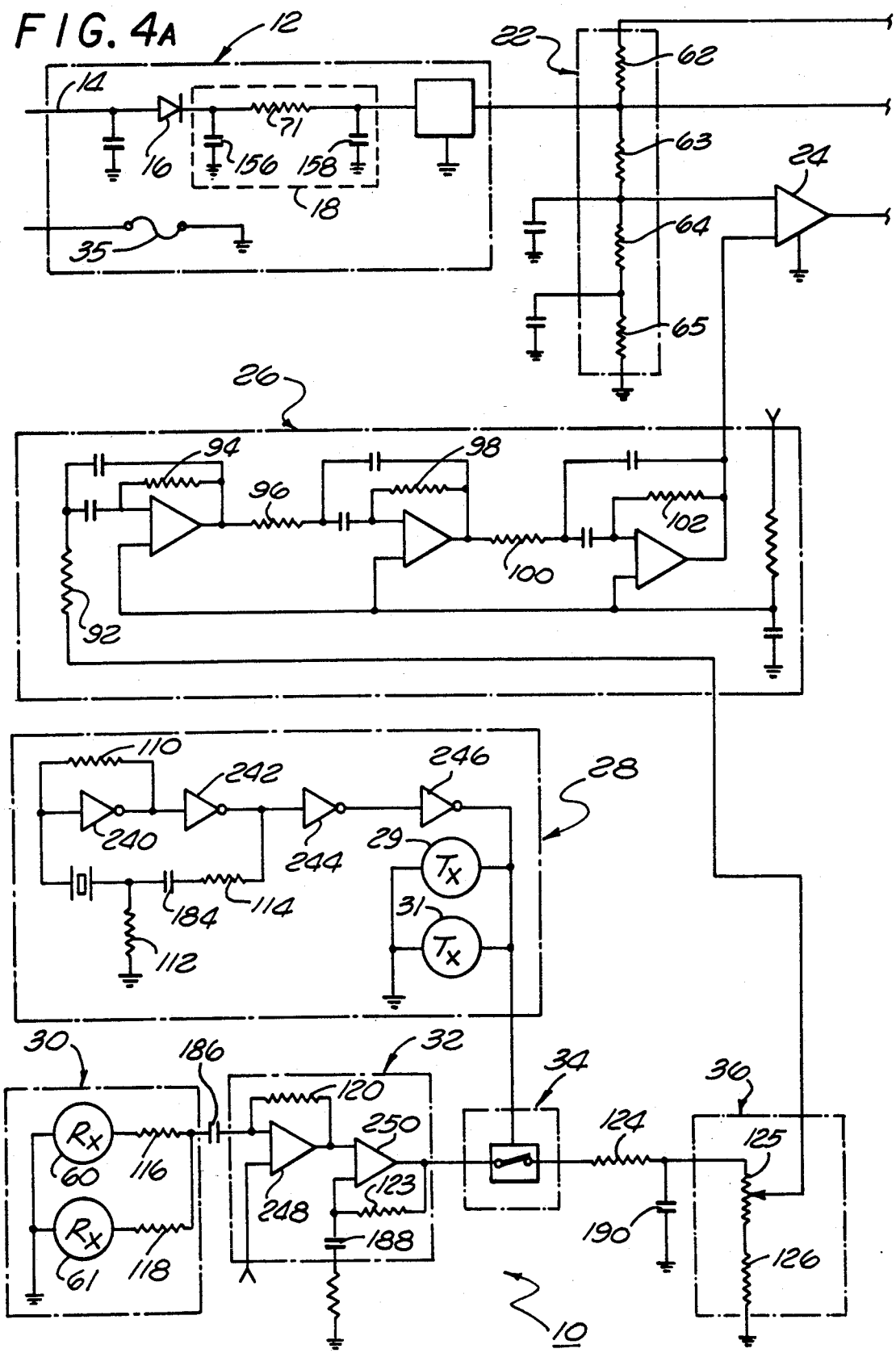

MOTION DETECTION SENSOR WITH COMPUTER INTERFACE

This application is a continuation of Ser. No. 07/549,331 filed Jul. 6, 1990, now abandoned.

BACKGROUND OF THE INVENTION

The present invention relates to a motion sensing ceiling sensor interface for a computer controller; and more particularly to a ceiling sensor which is operable through the use of motion detection to provide for automatic control of a work environment based upon occupancy.

In the work environment, lighting, heating, air conditioning and security utilize computerized controls which until now have required two separate systems. The use of a separate system for lighting and a separate system for energy management requires increased expense in the equipment used to control the environment of the office and in the labor to install and maintain it. Energy conservation based upon the selective actuation of various environmental interfaces such as light, heat, air conditioning and security, is extremely important not only from a business perspective but also for resource management.

It would be advantageous to manage the environment using the detection of employees in the work place so that light, heat, air conditioning and security are not inefficiently used. More importantly, a sensor system that could intelligently determine occupancy and control lighting as applied to a specific area could produce a significant cost savings by providing lighting only when as absolutely necessary.

SUMMARY OF THE INVENTION

The present invention, a ceiling sensor for a computer controllable interface, solves the problem of lighting and energy management systems that are being ineffectually used in the work environment. The ceiling sensors of this invention can, through contact closure by motion detection, provide a computer controller interface that is manufacturable in a controlled manner having consistent, reliable characteristics. The invention provides a ceiling mounted motion detection switch and computer controller interface which includes transmitting means having at least two transmitters that are operable to transmit an original signal of predetermined frequency into a room using a predetermined field of view. The ceiling mounted motion detection switch also includes timing means which is operable to time delay the transmission of this original signal for a preset, predetermined time period. This switch further includes at least two receivers that can receive the Doppler shift return signal from the room and differentiate that Doppler shifted return signal from all other circuit signals it may encounter. Means in the detection switch are provided to amplify the received Doppler shifted return signal. A comparator compares the received Doppler shifted amplified signal to the signal that was originally transmitted. A motion detection indicator is initiated into the "on" position if the received Doppler shifted amplified signal does not equal the original transmitted signal. Finally, an integral part of the switch is an isolated latch relay pulse means or circuit which is operable to turn on or turn off elements of a larger energy management system.

A method of providing a ceiling mounted motion detection switch and computer controller interface is also disclosed.

BRIEF DESCRIPTION OF THE DRAWINGS

A complete understanding of the present invention and of the above advantages may be gained from a consideration of the following description of the preferred embodiments taken in conjunction with the accompanying drawings in which:

FIG. 4A and 4B are a schematic representation of the electrical circuit for the ceiling sensor for both the large and narrow field of view areas.

DETAILED DESCRIPTION

The invention, a ceiling mounted motion detection switch and computer controller interface, consists of transmitting means wherein at least two transmitters are operating to transmit an original signal having a predetermined frequency that is dependent upon the type of motion to be detected into a room using a predetermined field of view.

The predetermined field of view is dependent upon the configuration of the room and in turn the type of motion to be detected will determine the frequency. A large area, such as a warehouse floor or shopping area or open office, would require a detector which is operable to detect the large movements or motions of peoples arms and legs. Correspondingly, the ceiling mounted motion detection switch and computer controller interface could, with a variation in the circuit elements, be operable in a long narrow area such as a warehouse corridor.

A ceiling sensor as described is designed to interface with computerized controllers operable to detect a contact closure. Two specific sensors that will be described in detail are a two-way sensor designed for a large office area operable to cover the square yardage area of approximately 2,160 square feet and a two-way sensor that is designed for warehouse aisles and corridors which can cover approximately 90 linear feet.

Each sensor provides an isolated contact closure whether or not motion is sensed. The computerized controller that interfaces with the two-way sensor can utilize the isolated contact closure to intelligently determine the occupancy and therefore control the lighting, heating, ventilating and air conditioning equipment in that specified area or office. If the computerized controller is also integrally interconnected with the security of the building or office, then the sensor could also be used to alert security to monitor the occupancy of the specific area.

To detect the broad movement which comes in a large area of approximately 60×30 feet, this ceiling mounted sensor would selectively turn lights on and off based upon the occupancy of that room. When a narrower area is surveyed using the ceiling sensor, the energy management system is initiated by the capture of short movements such as a typing motion by a secretary or clerk or the movements of an activity such as filing.

Figure 1A:
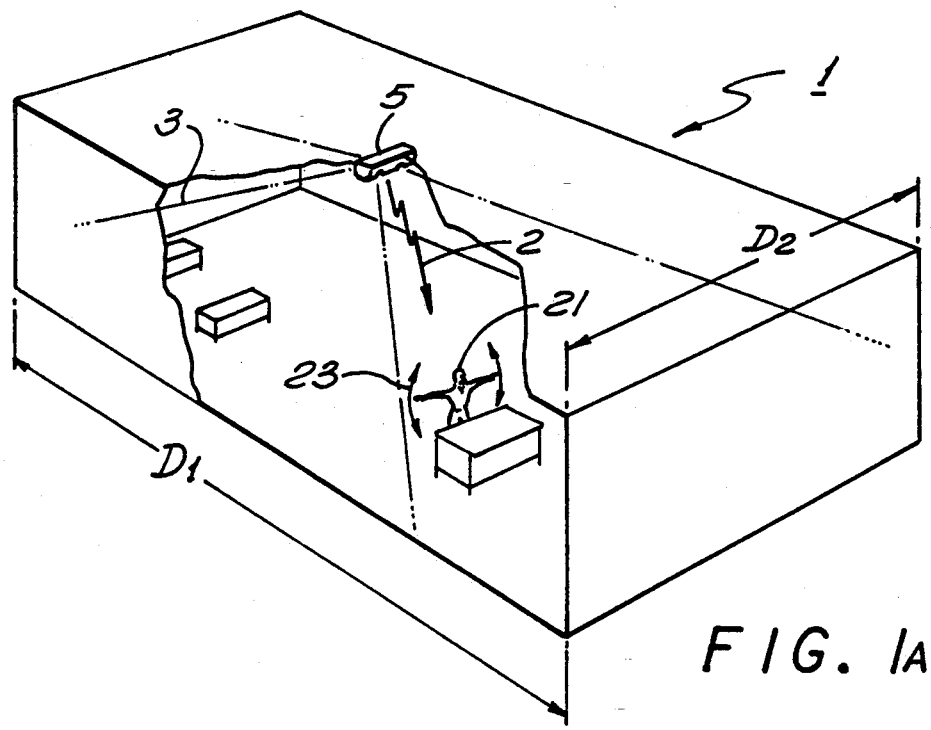
FIG. 1A is a schematic representation of the ceiling sensor operable in a large field of view area.

FIG. 1A is a schematic representation of the ceiling sensor operable in a large field of view area. In this example, the length of the room $D_1$, for example, 60 feet and having a width $D_2$ of 30 feet, would have a field of view 3 of approximately 2,160 square feet. A person 21 working in this room under the surveillance of the field of view 3 would, using large body movements 23, cause a Doppler shift in a signal transmitted from the ceiling sensor 5 in the predetermined field of view 3.

Figure 1B:
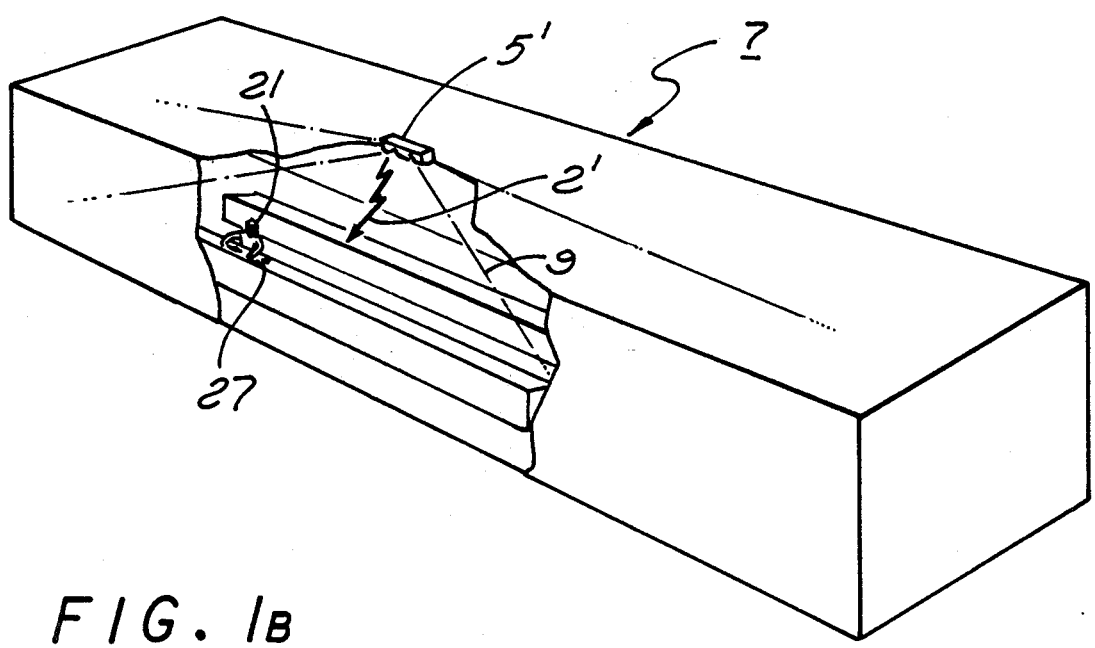
FIG. 1B is a schematic representation of a ceiling sensor operable for a narrow field of view area.

FIG. 1B is a schematic representation of the ceiling sensor operable in a narrow field of view area. In the example of Fig. 1B, the room 7 comprises a field of view 9 of approximately 90 linear feet. A person 21 using small, quick movements 27 is detected by the ceiling sensor 5' when the signal 2' is Doppler shifted as it encounters the movements 27 of the person 21.

Figure 2:
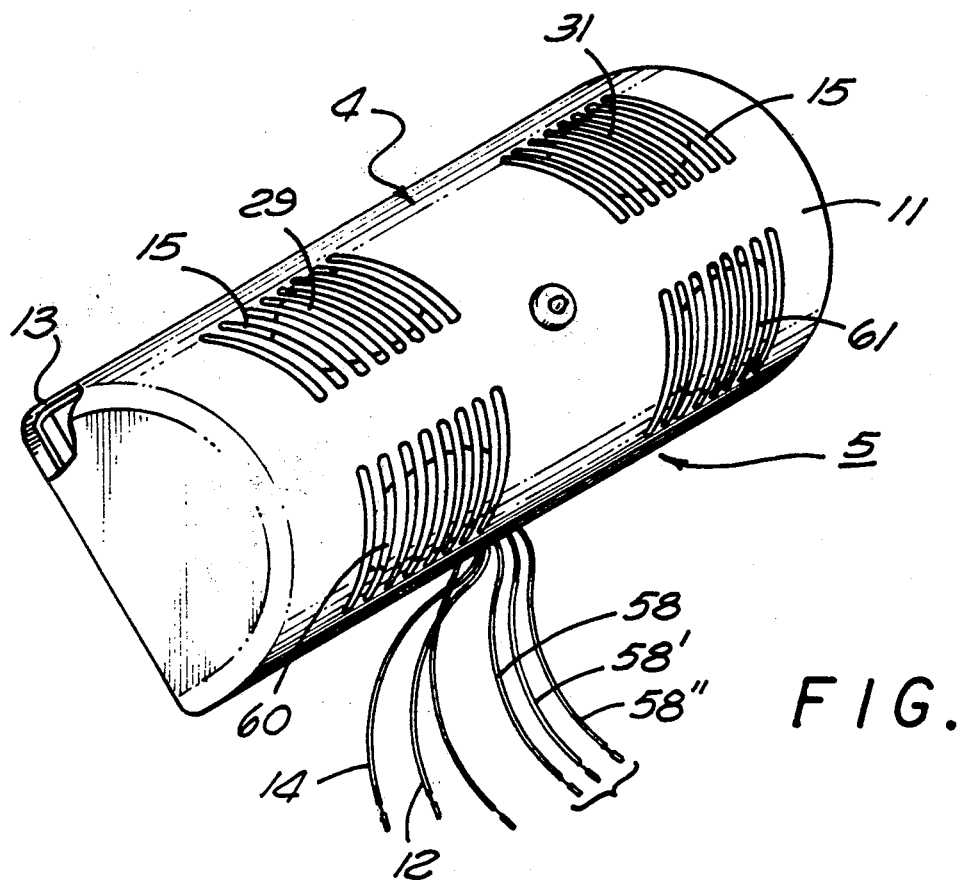
FIG. 2 is an orthogonal plan view of the exterior case of the ceiling sensor.

FIG. 2 is an orthogonal plan view of the exterior case 4 of the ceiling sensor, which comprises a cover plate 11 which engagingly interfits a back plate 13. The exterior case 4 is of a plastic material and has four orifices, beneath which reside the transmitting means 29 and 31 and the receiving means 60 and 61. Vents 15 are grooved within the plastic material to facilitate the transmission of a signal having a predetermined frequency 2 and in turn these grooves allow the reception of the Doppler shift frequency as it returns upon being shifted due to movement in a room. The voltage inputs 14 and 12 are shown in the form of hard wires which exit the back plate 13 of the sensor case 4. The outputs of the sensor 5 are shown as the three wires 58, 58' and 58".

Figure 3:
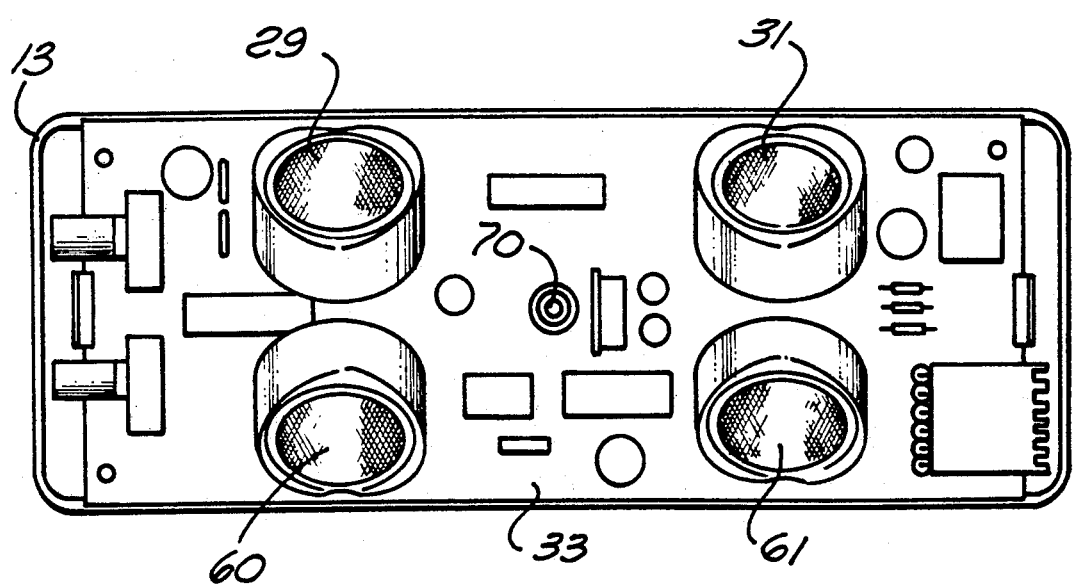
FIG. 3 is a top plan view of the circuit board for the ceiling sensor.

FIG. 3 is a top plan view of the circuit board for the ceiling sensor 5. The circuit board 33 rests upon the back mounting plate 13 wherein the first transmitter 29 can be seen mounted adjacent to the second transmitter 31 and the first receiver 60 is shown mounted parallel to the second receiver 61. LED 70 is used to indicate when a motion has been detected. As more clearly seen in FIG. 2, the LED 70 may be revealed by cutting an orifice into the face plate 11 of the case 4.

Figure 4B:
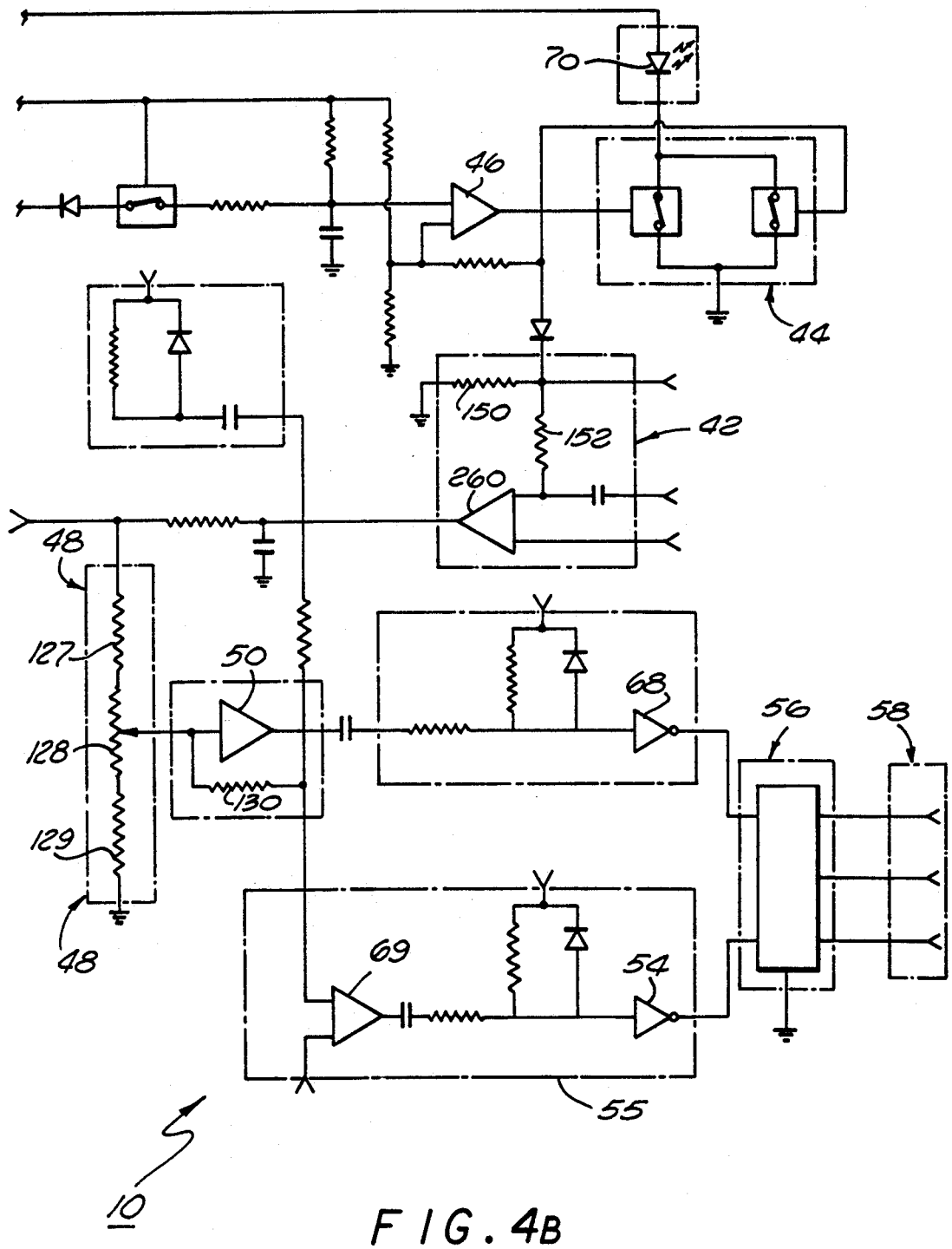

FIG. 4A and 4B, combined, is a schematic representation of the electrical circuit for the ceiling sensor for both large and narrow view areas. It should be noted that the only difference that gives rise to a wide field of view versus a narrow field of view, provided by the ceiling sensor 5, is a change in the values of the resistors 92, 94, 96, 98, 100 and 102 in the band pass filter 26 as shown in FIG. 4A. For example, resistors 92, 94, 96, 98, 100 and 102 for the wide field of view area of surveillance would have resistor values of 100K ohms, 1M ohm, 39K ohms, 3.3M ohms, respectively. If it was necessary to produce a sensor having a narrow field of view, resistors 92, 94, 96,98 and 102 in the band pass filter 26 would have values of 36K ohms, 300K ohms, 10K ohms, 1.2M ohms, 10K ohms and 1.2M ohms, respectively. The necessity of changing the resistance of the band pass filter 26 is driven by the fact that walking or large gross hand motions generate a different Doppler shift than quick delicate hand motions.

As shown in FIG. 4A, the ceiling sensor electrical schematic 10, includes a power system 12 that incorporates an input voltage 14, which in either embodiment of the ceiling censor will be 24 volts alternating current. A fuse 35 of 1 amp is also in the power system 12. This power system 12 provides half wave rectification by the use of the diode 16 and a filtering capability provided by resistors 71 and capacitors 156 and 158. The half wave rectification 16 and filtering 18 turns the 24 volts alternating current into 12 volts direct current. A bias network 22 which includes resistors 62, 63, 64 and 65, biases the operational amplifiers 24, 46, 50, 54, 68 and 69. The operational amplifier 24 is critical in that circuit as a comparator. Pin 3 of the operational amplifier 24 accepts a signal when received from the receivers and is compared to the signal at pin 2 of the operational amplifier 24. When the values determined at those two pins are distinct, then motion is detected. Electrically, the voltage on pin 2 of operational amplifier 24 would be higher than the voltage that is on pin 3. Pin 1 which is normally at a high voltage, drops when this voltage discrepancy occurs and the light emitting diode, LED 70 which is a detection indicator as more clearly shown in FIG. 4B, turns on and the timer circuit 48 is reset.

As shown in the electrical circuit in FIG. 4A, the two transmitters 29 and 31 as shown in the transmitting section 28 of the circuit 10, are operable to transmit a signal at a fixed frequency signal of, for example in this embodiment, 25,000 hertz. Also shown in the transmitting circuit 28 are the four integrated circuit chips 240, 242, 244 and 246 as well as resistor 110 which has a value of 4.7 megohms, resistor 112 which has a value of 680K ohms, resistor 114 which has a value of 390K ohms and capacitor 184 has a value of 22 pico farads.

As shown in FIG. 4A, the receiving section 30 of the circuit 10 contains first and second receivers 60 and 61. These receivers 60 and 61 are in series with resistors 116 and 118, each of which has a value of 2K ohms. The received signal, which is the returned Doppler shifted transmitted signal, is sent through a capacitor 186, which has a value of 0.01 microfarad, into a preamplification circuit 32, which is operable to amplify the Doppler shifted received signal. The preamplification circuit 32 includes two integrated circuit chips 248 and 250, a resistor 120 which is a value of 22K ohms, a capacitor 188 which has a value of 0.1 microfarad and a resistor 123 which has a value of 47K ohms. The preamplified signal enters a demodulator circuit 34 and then passes through a resistor 124 before entering into the sensitivity circuit 36 which comprises an option of two distinct resistors, resistor 125 and resistor 126. The overall circuit sensitivity is controlled through the choice between these two resistors 125 and 126. The resistor 124 has a value of 10K ohms, the capacitor 190 has a value of 0.01 microfarad, the resistor 125 has a value of 10K ohms and the resistor 126 has a value of 100 ohms.

The two demodulation circuits 36 and 34 determine the sensitivity of the system particularly on the resistors 125 and 126 located in circuit 36 as shown in FIG. 4A. These demodulation circuits 36 and 34 can be adjusted to demodulate the input of the 25 kilohertz signal such that the low frequency motion component of the 25 kilohertz signal can be removed providing a cleaner signal.

The preamplified, demodulated, Doppler shifted received signal now enters the three-stage amplifier or band pass filter 26 which as previously described, depending upon the resistance used, provides a field of view which is either wide or narrow. As shown in FIG. 4A, the further amplified preamplified, demodulated, Doppler shifted received signal enters the operational amplifier 24 where it is compared to the signal transmitted at a predetermined frequency which in this case is 25,000 hertz. As previously described, if an amplified preamplified, demodulated, Doppler shifted received signal is of a different frequency than the signal which has been transmitted, a motion has been detected and upon this motion detection the light emitting diode LED 70 is actuated or turned on by two switches in the switching circuit 44 of FIG. 4B.

This circuit 10 further includes, as shown in FIG. 4B, a slave input circuit 42 which facilitates the cascading of sensors over a large area by the tying of any two sensors together. As shown in FIG. 4B, the slave input includes integrated circuit chips 260, and resistors 150, 152 which have values of 150K ohms and 1M ohm, respectively. The capacitor 196 has a capacitance of 0.1 microfarad.

In order to permit an individual who has set the ceiling sensor to leave the room before the sensor detects motion and actuates elements of the energy management system, a timer switch or range clock is necessary within the circuit 10. In FIG. 4B, this time range circuit 48 is shown providing three resistors 127, 128 and 129 which have values of 1.5K ohms, 10K ohms and 1K ohms, respectively. The period of time which may be set for the delay for sensor activation is dependent upon the selection between the three resistor values. The delay could be any amount, for example, from 30 seconds to 12 minutes. The integrated circuit 50 incorporates an integrated chip and is parallel with a resistor 130 which, when combined, serves as a clock or timer.

The circuit in FIG. 4B incorporates a very vital and important link between the detection of motion and the actuation by the turning on or turning off of an element of an energy management system. This is the latching relay pulse network incorporating pulse network 54 and the actual latch relay 56. As shown in this embodiment, the latch relay 56 is what is called a "dry contact" in that it is not internally electrically connected to anything in the circuit 10. It is fully isolated. This is distinct from a "wet contact", which is integral to and electrically interconnected with the motion circuit providing a nonisolated latch relay. The possible ground loop effect which occurs when an electrical motion circuit and the latch relay are directly interconnected to the computer controller is thereby avoided through the use of the isolated latch relay. The output leads 58 which would correspond to outputs or wires leading from the ceiling sensor 5 would be interconnectable to, for example, light, heat, air conditioning or security and would be operable upon the detection of motion to turn on or turn off any of those elements of the energy management system.

While particular embodiments of the invention have been shown and described, it will be obvious to those skilled in the art that changes and modifications can be made without departing from the invention in its broader aspects and therefore the appended claims are intended to cover all such changes and modifications as followed in the true spirit and scope of the invention.

We claim:

1. A motion detection sensor for interface with a computerized controller of an energy management system containing a plurality of energy management elements, said sensor comprising:
    means for transmitting an original signal at a predetermined frequency into a room;
    means for receiving a Doppler shifted return signal from said transmitted original signal;
    amplification means for amplifying said received Doppler shifted return signal;
    comparator means for comparing said amplified, Doppler shifted return signal to said original signal;
    motion detection means for producing a motion detection indication signal if said received Doppler shifted amplified signal does not equal said original transmitted signal;
    an isolated dry contact, latching relay responsive to a first pulse to latch in a first contact closure position and to a second pulse to latch in a second contact closure position;
    pulse means for producing said first and second pulses in response to said motion detection indication signal to indicate occupancy in said room to said computerized controller by said first contact closure position and to indicate the absence of occupancy in said room to said computerized controller by said second contact closure position,
    whereby any one or more of said plurality of said energy management elements of said energy management system is controllable by said computerized controller in accordance with the occupancy, or absence of occupancy of said room.

2. The invention of claim 1 wherein said predetermined frequency is 25 Khz.

3. The invention of claim 1 wherein said means for transmitting further comprises:
    at least two transmitters so that said original signal is transmitted with a predetermined field of view.

4. The invention of claim 3 wherein said predetermined field of view is a narrow field of view of approximately 90 linear feet.

5. The invention of claim 3 wherein said predetermined field of view is a wide field of view of approximately 2,160 square feet.

6. The invention of claim 1 wherein said amplification means is a three-stage amplifier.

7. The invention of claim 1 wherein said motion detection means further comprises:
    a light emitting diode illuminated when said motion indication detection signal is produced.

8. The invention of claim 1 wherein said pulse means further comprises:
    means for generating said first pulse in response to said motion detection indication signal;
    delay means for generating said second pulse a predetermined time after the generation of said second pulse; and
    reset means responsive to said motion detection indication signal for resetting said delay means to restart said predetermined time,
    whereby said latching relay is latched in said first contact closure position by said motion detection indication signal and latched in said second contact closure position if said motion detection indication signal is absent for said predetermined time.

9. The invention of claim 8 wherein said delay means further comprises:
    means for adjusting said predetermined time in a range of about 30 seconds to about 12 minutes.

10. The invention of claim 1 wherein said latching relay further comprises:
    first, second and third contact leads, said firs and second leads being connected in said first contact closure position and said second and third leads being connected in said second contact closure position,
    whereby said computerized controller may selectively use a pair of connected leads or a pair of unconnected leads as an indication of occupancy or the absence of occupancy.

11. A ceiling mounted motion detection switch configured to interface with a computerized controller of an energy management system comprising:
- means for transmitting signals having at least two transmitters, said transmitters transmitting an original signal at a predetermined ultrasonic acoustic transmission frequency into a room using a predetermined field of view;
- timing means for delaying said transmission of said original signal for a predetermined time in arrange of between 30 seconds to 12 minutes;
- means for receiving return signals having at least two receivers, said receivers operable to receive a Doppler shifted return signal;
- amplification means operable to amplify said received Doppler shifted return signal;
- comparator means operable to compare said received, Doppler shifted amplified signal to said original transmitted signal;
- a motion detection indicator, said motion detection indicator operable to be initiated on if said received Doppler shifted amplified signal does not equal said original transmitted signal; and
- isolated latch relay pulse means operable to turn on or turn off any one of a plurality of elements of said energy management system when said received Doppler shifted amplified signal does not equal said original transmitted signal.

12. A method of indicating occupancy, or the absence of occupancy, in a room to a computerized controller of an energy management system containing a plurality of energy management elements, said method comprising the steps of:
- transmitting a original signal at a predetermined transmission frequency into a room
- receiving a Doppler shifted return signal caused by movement in said room;
- comparing said received, Doppler shifted return signal to said original transmitted signal;
- activating a motion detection indicator if said received Doppler shifted amplified signal does not equal said original transmitted signal;
- latching an isolated, dry contact interfacing relay in response to said activating of said motion detection indicator whereby any of said elements of said energy management system is controllable by said computerized controller in accordance with the occupancy, or absence of occupancy, in said room.

* * * * *